United States Patent
Puppin (10) Patent No.: US 9,009,028 B2
(45) Date of Patent: Apr. 14, 2015

(54) CUSTOM DICTIONARIES FOR E-BOOKS

(71) Applicant: Diego Puppin, Arlington, MA (US)

(72) Inventor: Diego Puppin, Arlington, MA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/715,398

(22) Filed: Dec. 14, 2012

(65) Prior Publication Data

US 2014/0172418 A1 Jun. 19, 2014

(51) Int. Cl.
*G06F 17/27* (2006.01)
*G06F 17/20* (2006.01)
*G06F 17/21* (2006.01)

(52) U.S. Cl.
CPC .................. *G06F 17/2735* (2013.01)

(58) Field of Classification Search
CPC ........................................ G06F 17/02
USPC .................................. 704/1, 9, 10
See application file for complete search history.

(56) References Cited

U.S. PATENT DOCUMENTS

| | | | |
|---|---|---|---|
| 5,451,163 A | 9/1995 | Black | |
| 5,920,838 A | 7/1999 | Mostow et al. | |
| 5,999,908 A | 12/1999 | Abelow | |
| 6,164,975 A | 12/2000 | Weingarden et al. | |
| 6,224,384 B1 | 5/2001 | Jenkins et al. | |
| 6,305,942 B1 | 10/2001 | Block et al. | |
| 6,322,366 B1 | 11/2001 | Bergan et al. | |
| 6,334,776 B1 | 1/2002 | Jenkins et al. | |
| 6,544,039 B2 | 4/2003 | Fiedorowicz et al. | |
| 6,544,042 B2 | 4/2003 | Lippman | |
| 6,606,480 B1 | 8/2003 | L'Allier et al. | |
| 6,726,486 B2 | 4/2004 | Budra et al. | |
| 6,801,751 B1 | 10/2004 | Wood et al. | |
| 7,050,753 B2 | 5/2006 | Knutson | |
| 7,386,453 B2 | 6/2008 | Polanyi et al. | |
| 7,669,111 B1 * | 2/2010 | Krause et al. .................. | 715/200 |

(Continued)

FOREIGN PATENT DOCUMENTS

| | | |
|---|---|---|
| JP | 2009-252060 A | 10/2009 |
| JP | 2012-190476 A | 10/2012 |

(Continued)

OTHER PUBLICATIONS

PCT International Search Report and Written Opinion for PCT/US2013/073819, Mar. 20, 2014, 9 Pages.

(Continued)

*Primary Examiner* — Jesse Pullias
(74) *Attorney, Agent, or Firm* — Fenwick & West LLP (57) ABSTRACT

A custom dictionary is generated for an e-book. A dictionary management system receives a custom dictionary request from a user client operated by a user, the custom dictionary request identifying the e-book and including dictionary management information describing the user. The dictionary management system chooses a group reader profile that has an associated group reading score for the user based on the dictionary management information and candidate words are identified in the identified e-book for inclusion in the custom dictionary. The dictionary management system selects words for inclusion in the custom dictionary from among the candidate words responsive to the associated group reading score for the chosen group reading profile. The dictionary management system generates the custom dictionary using the selected words, and provides the generated custom dictionary to the user client.

18 Claims, 4 Drawing Sheets

(56) References Cited

U.S. PATENT DOCUMENTS

| | | |
|---|---|---|
| 7,899,674 B1 | 3/2011 | Rubin |
| 8,083,523 B2 | 12/2011 | De Ley et al. |
| 8,137,106 B2 | 3/2012 | De Ley et al. |
| 8,155,950 B1 | 4/2012 | Bickerstaff |
| 8,166,418 B2 | 4/2012 | Williams |
| 8,182,270 B2 | 5/2012 | Elzinga et al. |
| 8,744,855 B1* | 6/2014 | Rausch ............ 704/270 |
| 2001/0041330 A1 | 11/2001 | Brown et al. |
| 2002/0106617 A1 | 8/2002 | Hersh |
| 2002/0107681 A1 | 8/2002 | Goodkovsky |
| 2002/0138456 A1 | 9/2002 | Levy et al. |
| 2002/0147782 A1 | 10/2002 | Dimitrova et al. |
| 2002/0188583 A1 | 12/2002 | Rukavina et al. |
| 2002/0199166 A1* | 12/2002 | Volcani et al. .......... 717/100 |
| 2003/0039948 A1 | 2/2003 | Donahue |
| 2003/0064354 A1 | 4/2003 | Lewis |
| 2003/0152894 A1* | 8/2003 | Townshend ............ 434/178 |
| 2004/0161734 A1 | 8/2004 | Knutson |
| 2005/0026131 A1 | 2/2005 | Elzinga et al. |
| 2006/0105313 A1 | 5/2006 | Mansfield et al. |
| 2006/0127871 A1 | 6/2006 | Grayson |
| 2006/0282778 A1 | 12/2006 | Barness et al. |
| 2007/0048696 A1 | 3/2007 | Blank |
| 2007/0224586 A1 | 9/2007 | Massie et al. |
| 2008/0243805 A1 | 10/2008 | Gutta et al. |
| 2009/0106789 A1 | 4/2009 | Lee et al. |
| 2011/0251837 A1 | 10/2011 | Conboy et al. |
| 2012/0077155 A1* | 3/2012 | Siani ................... 434/156 |

FOREIGN PATENT DOCUMENTS

| | | |
|---|---|---|
| KR | 10-2000-0060515 A | 10/2000 |
| WO | WO 2012/032535 A1 | 3/2012 |

OTHER PUBLICATIONS

PCT International Search Report and Written Opinion for PCT/US2013/066320, Feb. 14, 2014, 7 Pages.

Dedhia, S., "Hide & Show Section or Paragraphs in Microsoft Word Documents with More Add-in," Blogs DNA, Sep. 15, 2010, 4 pages [online] [retrieved on Feb. 6, 2013] Retrieved from the internet <URL:www.blogsdna.com/12333/hide-show-sections-or-paragraphs-in-microsoft-word-documents-with-more-add-in.htm>.

Elmaani, A., "Summarize Articles, Editorials and Essays Automatically," 2009-2012, 1 page [online] [retrieved on Feb. 6, 2013] Retrieved from the internet <URL:www.smmry.com>.

Google Inc., "Trends" 2013, 1 page [online] [retrieved on Feb. 6, 2013] Retrieved from the internet <URL: www.google.com/trends/>.

Merriam-Webster, "Word of the Year 2011," Dec. 15, 2011, 2 pages, [online] [retrieved on Feb. 6, 2013] Retrieved from the internet <URL:www.merriam-webster.com/info/2011words.htm>.

Microsoft, "Use hidden text in Microsoft Office Word 2007," 2013, 2 pages [online] [retrieved on Feb. 6, 2013] Retrieved from the internet <URL:www.microsoft.com/education/en-us/teachers/how-to/Pages/hidden-text.aspx>.

Renouf, A., et al., "A System of Automatic Textual Abridgement," CiteSeer, 13 pages [online] [retrieved on Feb. 25, 2013] Retrieved from the internet <URL:http://www.google.com/url?sa=t&rct=j&q=&esrc=s&source=web&cd=1&ved=0CCcQFjAA&url=http%3A%2F%2Fciteseerx.ist.psu.edu%2Fviewdoc%2Fdownload%3Fdoi%3D10.1.1.159.5838%26rep%3Drep1%26type%3Dpdf&ei=lcgYT5ilNqne0QG74fzPCw&usg=AFQjCNFEwjGsvyczji9IXEw8r6B05UU-dA>.

Sauper, C., et al., "Automatically Generating Wikipedia Articles: A Structure-Aware Approach," MIT, 2009, 9 Pages, can be retrieved at <URL:http://people.csail.mit.edu/csauper/pubs/sauper-acl-09.pdf>.

Webpage for Narrative Science, 2010-2013, 3 Pages [online] [Retrieved on Apr. 2, 2013] Retrieved from the internet <URL:http://narrativescience.com/>.

Webpage for Project Possibility, 2013, 2 Pages [online] [Retrieved on Apr. 2, 2013] Retrieved from the internet <URL: http://www.projectpossibility.org/viewProject.php?id=1>.

* cited by examiner

CUSTOM DICTIONARIES FOR E-BOOKS

BACKGROUND

1. Field of Disclosure

This disclosure relates to the field of text processing generally, and specifically to the automatic generation of custom e-book dictionaries.

2. Description of the Related Art

Many users utilize their digital devices to read material such as novels, news articles, short stories, etc. For example, e-readers and tablet computers are commonly used to read e-books, which are books in a digital format. Most e-books do not contain any dictionary, glossary, etc., that define terms within the e-book. Poor readers may have trouble with certain terms in the text of the e-book. For example, a user may have problems understanding terms that are rarely used in the text of the e-book.

In some cases, digital devices have an on-board general dictionary which the user may use to look up a term. But, the content of the general dictionary is the same regardless of the text of the e-book. Thus, there is the possibility for terms in the e-book that are not in the general dictionary. For example, an e-book may contain some Latin terms that are not found in the general dictionary. The missing terms may result in the user comprehending less of the text, and possibly force the user to perform a search outside of the general dictionary to determine a term's definition.

SUMMARY

The above and other needs are met by a computer-implemented method, a non-transitory computer-readable storage medium storing executable code, and a system for generating a custom dictionary for an e-book.

One embodiment of the computer-implemented method for generating a custom dictionary for an e-book, comprises receiving a custom dictionary request from a user client operated by a user, the custom dictionary request identifying the e-book and including dictionary management information describing the user. A group reader profile is chosen that has an associated group reading score for the user based on the dictionary management information and candidate words are identified in the identified e-book for inclusion in the custom dictionary. Words are selected for inclusion in the custom dictionary from among the candidate words responsive to the associated group reading score for the chosen group reading profile. The custom dictionary is generated using the selected words, and is provided to the user client.

One embodiment of a non-transitory computer-readable storage medium storing executable computer program instructions for generating a custom dictionary for an e-book, comprises receiving a custom dictionary request from a user client operated by a user, the custom dictionary request identifying the e-book and including dictionary management information describing the user. A group reader profile is chosen that has an associated group reading score for the user based on the dictionary management information and candidate words are identified in the identified e-book for inclusion in the custom dictionary. Words are selected for inclusion in the custom dictionary from among the candidate words responsive to the associated group reading score for the chosen group reading profile. The custom dictionary is generated using the selected words, and is provided to the user client.

One embodiment of a system for generating a custom dictionary for an e-book, comprises a processor configured to execute modules, and a memory storing the modules. The modules include a user account manager module configured to receive a custom dictionary request from a user client operated by a user, the custom dictionary request identifying the e-book and including dictionary management information describing the user. The modules also include a group profiler module configured to choose a group reading profile having an associated group reading score for the user based on the dictionary management information, and a word identifier module configured to identify candidate words in the identified e-book for inclusion in the custom dictionary. The modules also include a dictionary generator module configured to select words for inclusion in the custom dictionary from among the candidate words responsive to the associated group reading score for the chosen group reading profile, and generate the custom dictionary using the selected words. The modules also include a dictionary server module configured to provide the generated custom dictionary to the user client.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
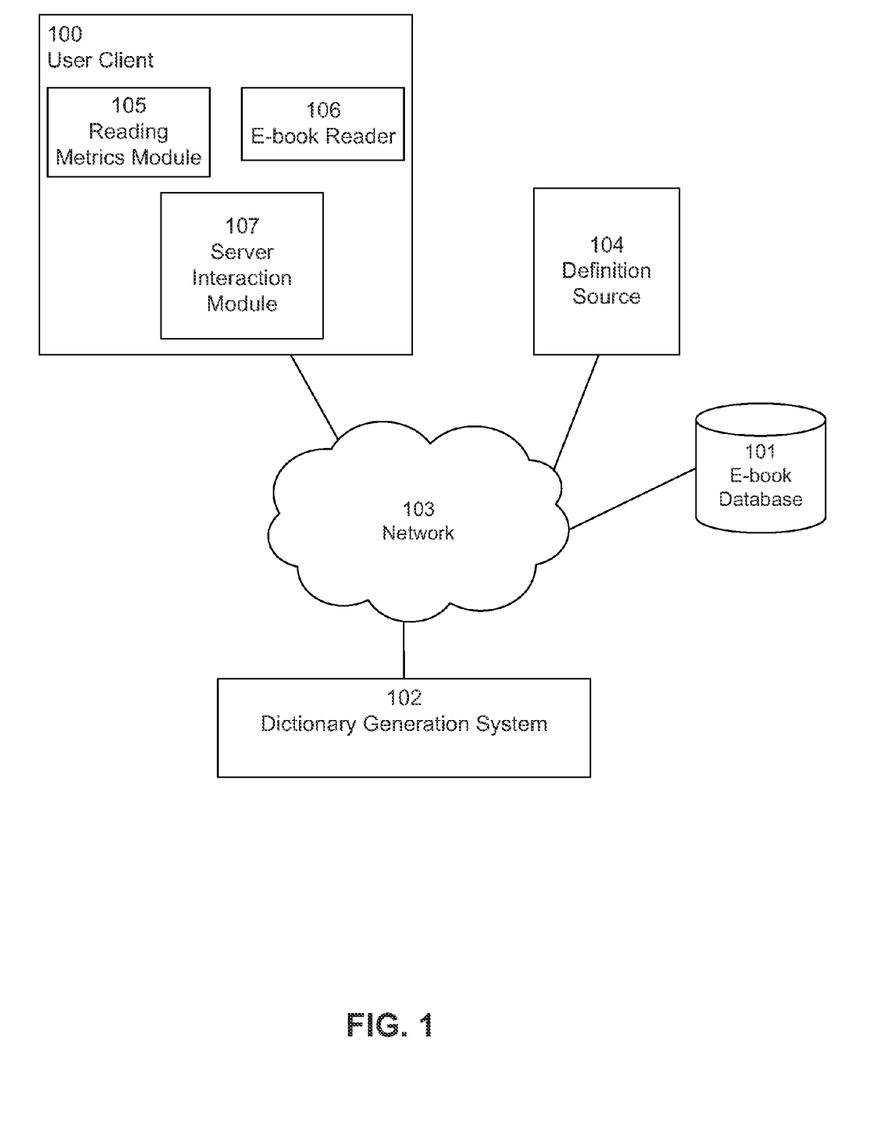
FIG. 1 is a high-level block diagram illustrating an embodiment of an environment for generating custom dictionaries.

FIG. 1 is a high-level block diagram illustrating an embodiment of an environment for generating custom dictionaries. The environment includes a dictionary generation system (DGS) 102 connected by a network 103 to a user client 100, an e-book database 101, and a definition source 104. Here only one user client 100, DGS 102, e-book database 101, and definition source 104 are illustrated but there may be multiple instances of each of these entities. For example, there may be thousands or millions of user clients in communication with multiple DGSs 102, definition sources 104, and e-book databases 101.

The network 103 provides a communication infrastructure between the user clients 100, the e-book databases 101, the DGSs 102, and the data sources 104. The network 103 is typically the Internet, but may be any network, including but not limited to a Local Area Network (LAN), a Metropolitan Area Network (MAN), a Wide Area Network (WAN), a mobile wired or wireless network, a private network, or a virtual private network.

The user clients 100 are computing devices that execute computer program modules—e.g., a web browser or other client application—which allow a user to view e-books and consume other media. A user client 100 might be, for example, a personal computer, a tablet computer, a smart phone, a laptop computer, a dedicated e-reader, or other type of network-capable device such as a networked television or set-top box. The user client 100 may also allow a user to establish a user profile with the DGS 102.

A user client 100 comprises a reading metrics module 105, an e-book reader 106, and a server interaction module 107 in one embodiment. In one embodiment these entities are software application modules executing on the user client 100. For example, the modules 105, 106, and 107 may be integrated into a smart phone application executing on a smart phone.

The reading metrics module 105 collects dictionary management information describing the user and about the user's current e-book usage. Dictionary management information may include, for example, the user's current reading location, user demographic information, reading speed (e.g., based on their rate of page turning), bookmark locations, e-book identifiers, e-book metadata that may be used to retrieve an e-book identifier, reading level, reading level threshold, click history, reading history, and information about text that is skipped, highlighted or noted by a user during reading. Dictionary management information may also include information about words that a user looks up using the user device 100. This information may include, for example, which words the user looked up, whether the looked up word was present on the active page (i.e., the page last read by user) of the e-book, the manner in which the user looked up the word (e.g., did the user use a third party website or local dictionary software package?), etc. The dictionary management information may also include information about the user such as a user identifier, which may be used by the DGS 102 to uniquely identify the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by user client 100 and DGS 102.

The e-book reader 106 enables a user operating the user client 100 to request a portion of an e-book (which could be the entire e-book), and to view the requested portion of the e-book once the e-book data has been downloaded. For example, the user operating the user client 100 may select an e-book to read from a list of e-book choices displayed via the e-book reader 106, and the e-book reader then sends a request for the selected e-book to the DGS 102. The e-book request includes an e-book identifier that identifies the e-book and dictionary management information for the user. The e-book identifier may comprise, for example, information that identifies a book such as a title, author, publishing date, International Standard Book Number (ISBN), or another identifier known to the DGS 102. In another embodiment the e-book identifier is a hash that is computed from the data associated with the e-book, and which uniquely identifies the e-book. The hash may be computed by the e-book reader 106 from the e-book or it may be received from the DGS 102, the e-book database 101, or other sources of e-book data. The e-book request may also be used to request a dictionary that is custom to a user of the user client 100 and an e-book.

The e-book reader 106 may download the requested e-book (or portions thereof) over the network 103 from the DGS 102, a separate e-book database 101, and other sources such as e-book retailers, libraries, and local storage. The e-book reader 106 is configured to display e-book data (i.e., data that corresponds to the e-book) to a user operating the user client 100, enabling the user to read the e-book data.

Additionally, the e-book reader 106 enables a user operating the user client 100 to request a dictionary that is custom to the user and the e-book. The request includes dictionary management information associated with the e-book requested by the user. The e-book reader 106 may request the custom dictionary at any time from the DGS 102. Additionally, in some embodiments the e-book reader 106 automatically requests the custom dictionary when an e-book is requested by the user, e.g., in conjunction with an e-book request.

The e-book reader 106 may display a custom dictionary (or portions thereof) that is customized to a user of the user client 100 and an e-book. The custom dictionary is customized to the e-book and the user as it is generated using words within the e-book which the user is unlikely to understand. The custom dictionary includes words customized to the e-book and user, includes definitions for the words, and also includes complexity scores associated with the words. A complexity score is a numeric value associated with a word that indicates a likelihood that the word is not known by a reader.

In some embodiments, the e-book reader 106 allows the user to further customize which words are included in the custom dictionary by enabling the user to adjust a reading level threshold via a user interface. The user interface may be hardware, software, or a combination thereof, and contains a plurality of reading level settings with corresponding reading threshold values. A reading level describes the likelihood of a reader to understand a word of a particular complexity score. The reading level has a corresponding, numeric, reading level threshold. The user interface is initially set to a default level that corresponds to an initial reading level threshold that is received from the DGS 102. For example, the e-book reader 106 may include a dial with selections indicative of a range of reading levels (e.g., kindergarten through post-graduate) that each have an associated reading threshold value. The user may adjust the reading level away from the default level by adjusting the dial. In some embodiments, if the reading level is adjusted away from the initial reading level, the e-book reader 106 may request a new custom dictionary or any missing word definition information. In embodiments where the custom dictionary includes word definition information for all words within the e-book, if the reading level is adjusted to a new reading level, the e-book reader 106 may limit the words within the custom dictionary to those with complexity scores above the reading level threshold associated with the new reading level. Additionally, in some embodiments, the e-book reader 106 may receive updates to the custom dictionary from the DGS 102. Updates to the custom dictionary may include, for example, missing word definition information and/or new complexity scores for one or more words.

In some embodiments, words in the e-book that are in the custom dictionary and have a complexity score higher than the reading level threshold may be emphasized when they appear in a displayed portion of the e-book. Words are emphasized so the user knows that the emphasized words may be looked up in the custom dictionary. An emphasized word is changed to distinguish it from other non-emphasized text in the e-book. For example, an emphasized word may be highlighted, bolded, italicized, underlined, in a different font from the non-emphasized words, in a different font size from the non-emphasized words, in a different font color from the non-emphasized words, or some combination thereof.

Additionally, in some embodiments, the e-book reader 106 allows the user to further customize which words are emphasized by adjusting the reading level threshold via the user interface. For example, words with complexity scores above the adjusted reading level threshold would be emphasized. The e-book reader 106 may provide the reading level, any adjustments made by the user to the reading level to the DGS 102 (e.g. as dictionary management information), any associated reading thresholds, or some combination thereof.

The e-book reader 106 may access the custom dictionary to display portions of the custom dictionary. For example, a user may access the custom dictionary via a menu command in the e-book reader 106. Additionally, in some embodiments, the e-book reader 106 may retrieve word definition information from the custom dictionary for one or more emphasized words.

In some embodiments, the e-book reader 106 may automatically display word definition information for one or more of the emphasized words. Alternatively, the word definition information may display word definition information for emphasized words that have been selected by the user. The word definition information may be displayed, for example, in a footnote of the displayed e-book text, in a side panel next to the displayed e-book text, or by displaying a page from the dictionary.

The server interaction module 106 communicates data between the user client 100, and the DGS 102 and the e-book database 101, via the network 103. The server interaction module 106 sends custom dictionary requests, via the network 103, to the DGS 102. A custom dictionary request is a request for a custom dictionary that includes dictionary management information. For example, a custom dictionary request may be an e-book request, or some other request for a custom dictionary that includes dictionary management information. Additionally, the server interaction module 106 may receive e-books from the DGS 102 or the e-book database 101, and custom dictionaries, word definition information, and word complexity scores from the DGS 102.

The e-book database 101 is an archive that stores e-book data. This data includes the text contents of the e-books. In one embodiment, the e-book database 101 is a part of the DGS 102. In another embodiment, the e-book database 101 is an archive maintained by a third-party such as an e-book retailer or library. In some embodiments, the e-book database 101 may also store word complexity scores associated with the words in the stored e-books.

The definition source 104 is a computer server that stores word definition information. Word definition information is information that defines a word or grouping of words. Word definition information may include, variations of the word, declination of the word, pronunciation of the word (e.g., may include a text-to-speech function), snippets from the e-book text showing examples of usage, and links to pages in the e-book where the word appears. In some embodiments, word definition information may also comprise a link to a location where the definition resides or may be determined. For example, the link may be to a definition source 104. The definition source 104 may be, for example, a website or data archive that stores word definition information, provides lookup services (e.g., dictionary, thesaurus, and encyclopedia). For example, definition source 104 may be WIKIPEDIA, DICTIONARY.COM, THESAURUS.COM, etc. Additionally, in some embodiments, definition source 104 may be a search engine like, for example, GOOGLE, YAHOO!, BING, etc. The definition source 104 stores and provides definition information to DGS 102. Embodiments may include multiple, different, dictionary sources 104.

The DGS 102 receives dictionary management information from a user client 100. Based on the dictionary management information, the DGS 102 chooses a group reading profile from a plurality of group reading profiles for association with the user. Each group reading profile has an associated group reading score. A low group reading score is indicative of a smaller vocabulary, while a high group reading score indicates a larger vocabulary. For example, users who are doctors may be associated with a group reading profile that has a high group reading score. In contrast, users who are in high school may be associated with a different group reading profile that has a lower group reading score. The DGS 102 selects the group reading profile that most closely describes the user. For example, the DGS 102 may compare components of the dictionary management information with the various group reading profiles to select a group reading profile that most closely describes the user. The group reading score associated with the profile is set as the initial value for the user's reading level threshold.

The DGS 102 identifies and selects candidate words in the identified e-book for inclusion in the custom dictionary using complexity scores associated with the words in the e-book. In one embodiment, the DGS 102 selects candidate words for inclusion in the custom dictionary with complexity scores higher than the group reading score associated with the selected group reading profile. In alternate embodiments, the DGS 102 selects all the candidate words for inclusion in the custom dictionary. Additionally, the DGS 102 may adjust complexity scores upward or downward for candidate words based on dictionary management information and/or the user profile. For example, the DGS 102 may adjust complexity scores downward for words which the user has recently looked up.

The DGS 102 creates a custom dictionary using the selected candidate words, definition information, and a reading threshold level, and provides the custom dictionary to the user client 100. The DGS 102 may communicate the custom dictionary (or portions thereof) to the user client 100 concurrent with the requested e-book, after the e-book has been provided, or upon request by user client 100. Thus, the DGS 102 is able to create and provide a dictionary for an e-book that is custom to the needs of the requesting user.

Figure 2:
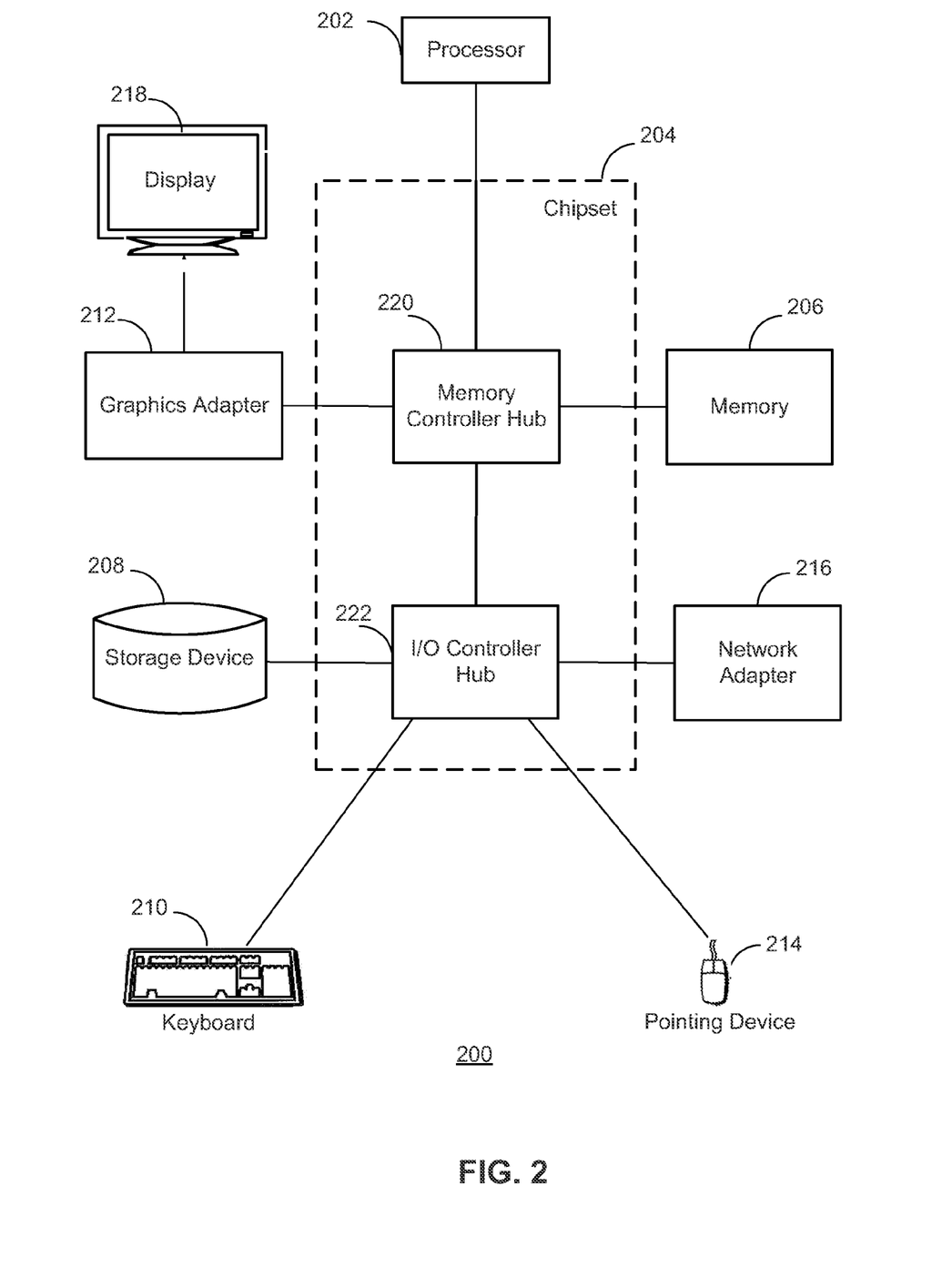
FIG. 2 is a high-level block diagram illustrating an example computer for implementing the entities shown in FIG. 1.

FIG. 2 is a high-level block diagram illustrating an example computer 200 for implementing the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the DGS 102 might comprise multiple blade servers working together to provide the functionality described herein. The computers 200 can lack some of the components described above, such as keyboards 210, graphics adapters 212, and displays 218. In addition, the DGS 102 can run in a single computer 200 or multiple computers 200 communicating with each other through a network such as in a server farm.

Figure 3:
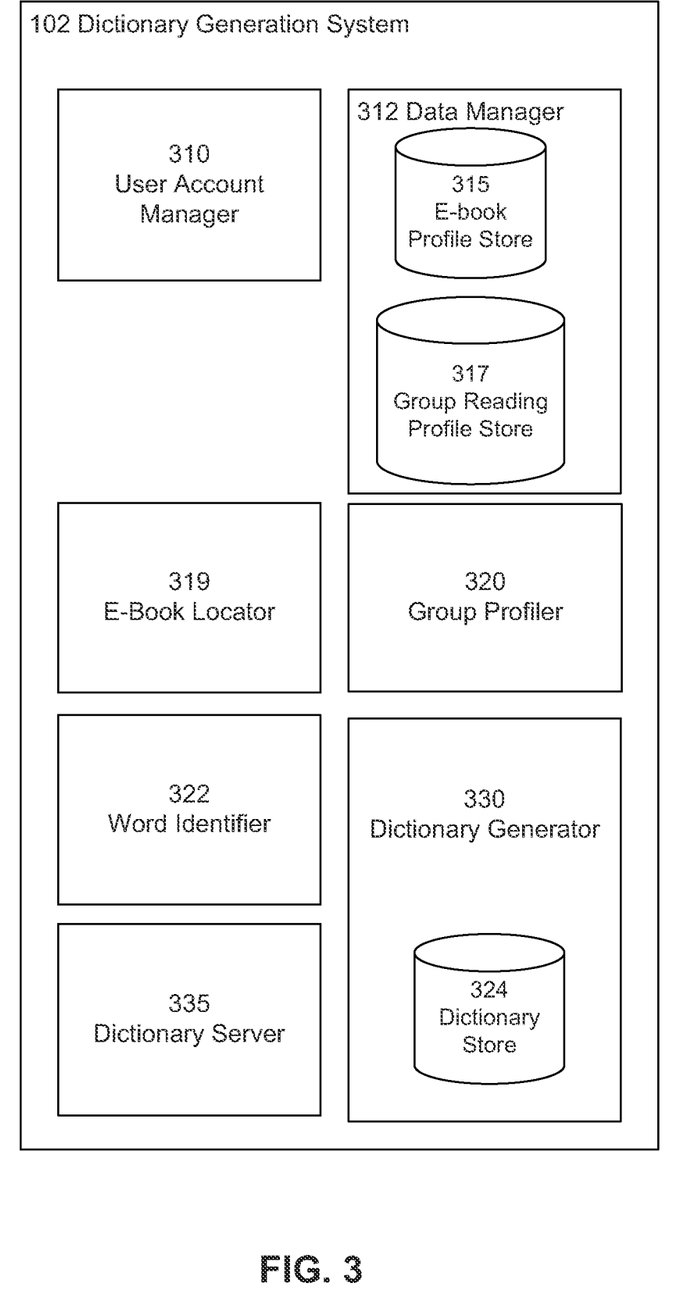
FIG. 3 is a high-level block diagram illustrating a detailed view of modules within the e-book management system according to one embodiment.

FIG. 3 is a high-level block diagram illustrating a detailed view of modules within the DGS 102 according to one embodiment. Some embodiments of the DGS 102 have different modules than those described here. Similarly, the functions can be distributed among the modules in a different manner than is described here. The DGS 102 is comprised of modules including a user account manager 310, a data manager 312, an e-book locator 319, a group profiler 320, a word identifier 322, a dictionary generator 330, and a dictionary server 335.

The user account manager 310 receives a custom dictionary request from a user client operated by a user, the custom dictionary request identifying an e-book and including dictionary management information describing the user. For example, the user account manager 310 may receive an e-book request or a custom dictionary request from a server interaction module 106 operating on a user client 100. The user account manager 310 extracts dictionary management information from the custom dictionary request. The user account manager 310 distributes the dictionary management information to other modules in the DGS 102.

Additionally, the user account manager 310 identifies and authenticates the user using the dictionary management information associated with the user. Each user may have a distinct account on the DGS 102. With the permission of the user, the user account manager 310 collects data about each user that may be useful in the creation of dictionaries custom to a particular user. This information may include dictionary management information from the server interaction module 106, etc. The user account manager 310 may also collect data related to the user from third-party sources such as book retailers, the e-book database 101, social networking systems, etc. Also the user account manager 310 may collect data related to users associated with the user requesting the e-book.

The data manager 312 stores and manages user information, dictionary management information, data related to e-books, and group reading profiles. The data manager 312 comprises an e-book profile store 315 and a group reading profile store 317, in one embodiment.

The e-book profile store 315 stores information related to e-books. Information related to e-book is information that describes an e-book or the text of the e-book. The information for each e-book may be stored in an e-book profile for that e-book. For a given e-book, the e-book profile may contain an e-book identifier, the text of the e-book, complexity scores associated with words within the e-book, and metadata related to the e-book. The metadata may comprise, for example, the book's author, date of publishing, reviews, genre information, publisher, ratings, etc.

The group reading profile store 317 stores group reading profiles. A group reading profile describes the reading level for a particular group of users with a particular background. Each group reading profile has an associated group reading score.

The e-book locator 319 retrieves an e-book requested by the user client 100 and the complexity scores of the words within the e-book using the dictionary management information included in the custom dictionary request. In one embodiment, the e-book locator 319 extracts an e-book identifier from the dictionary management information that may be used to retrieve the e-book and the complexity scores of words within the e-book from e-book database 101. Alternatively, the e-book locator 319 can extract e-book metadata from the dictionary management information and match the e-book metadata with an e-book identifier using a lookup table. The e-book locator 319 provides the retrieved e-book and complexity scores to e-book profile store 315.

The group profiler 320 creates group reading profiles by analyzing dictionary management information for groups of users with similar backgrounds (e.g., demographics, reading history, etc.) to identify group reading scores for each group of users. Thus, each group reading profile has a corresponding group reading score. A group reading score is a numeric score that indicates the reading ability of the users associated with the corresponding group reading profile. For example, college graduates may be grouped into a group reading profile with a corresponding first group reading score, and high-school students may be grouped into a separate group reading profile with a corresponding second group reading score that is lower than the first group reading score. The group profiler 320 determines the group reading score for each group reading profile using the dictionary management information of users associated with the group reading profile. For example, the group profiler 320 may determine the group reading score by averaging the reading level thresholds for some or all of the users associated with the same group reading profile and setting the averaged reading level threshold as the group reading score.

Additionally, the group profiler 320 may update the group reading score associated with a group reading profile by analyzing dictionary management information received from various user clients 100 with similar backgrounds as the group reading profile. The group profiler 320 monitors the reading level included in each of the users' dictionary information. If the group profiler 320 determines that the reading level is adjusted (e.g., user manually changes reading level) in such a manner that the average reading level threshold has changed, the group profiler 320 adjusts the group reading score to correspond to the new average reading level threshold.

The group profiler 320 chooses a group reading profile for the user based on the dictionary management information. For example, the DGS 102 may compare demographic components of the dictionary management information with the various group reading profiles to select a group reading profile closest to the user.

The word identifier 321 identifies candidate words in the identified e-book for inclusion in the customized custom dictionary. The word identifier 321 identifies a word in the e-book as a candidate word if the word has an associated complexity score. The word identifier 321 retrieves text from the e-book and its associated complexity scores from, for example, e-book profile store 315, or e-book database 101.

In embodiments where no complexity scores are retrieved (e.g. from e-book database 101), the word identifier 321 may calculate the complexity scores of the words in the e-book. The word identifier 321 may calculate the complexity score in different ways. For example, in one embodiment, the complexity score is calculated using term frequency-inverse document frequency (TF-IDF) information received from, for example, the e-book database 101. Here, the TF-IDF value is based on the frequency of the term in the requested e-book, divided by the frequency or weighted (multiplied) by the inverse of the frequency of the term in a corpus of e-books. Thus, the TF-IDF increases proportionally to the number of times a word appears in the requested e-book, but is offset by the frequency of the word in the corpus of e-books, which helps to control for the fact that some words are generally more common than others.

Additionally, the corpus of e-books that serves as the denominator in the TF-IDF calculation may vary in different embodiments. In one embodiment, the corpus of e-books may be all e-books stored in the e-book database 101. In contrast, in other embodiments, the corpus of e-books may be subset of all the stored e-books. For example, if the requested e-book is a children's book, the corpus of books may restricted to children's books. Additionally, the corpus of books may be a set of books derived from the user's reading history. For example, a doctor (e.g., an ophthalmologist) who only reads medical texts would have only medical texts in the corpus of books. The TF-IDF calculation would filter complex medical terms that commonly appear in the corpus, thus preventing words like "ophthalmologist" from appearing in the ophthalmologist's custom dictionary.

The word identifier 321 selects words for inclusion in the custom dictionary from among the candidate words responsive to the associated group reading score for the chosen group reading profile. The word identifier 321 sets the initial reading level threshold to the group reading score. Words with complexity scores above the reading level threshold are unlikely to be understood by the user. The word identifier 321 selects candidate words for inclusion in the customize dictionary that have higher complexity scores higher than the reading level threshold. In alternate embodiments, the word identifier 321 selects all the candidate words for inclusion in the customized dictionary.

The word identifier 321 may adjust the complexity scores higher or lower in accordance with the dictionary management information. For example, the initial reading threshold and complexity score for 'bucolic' may be such that it is initially identified as a candidate word (i.e. the complexity score is less than the initial reading threshold). The word identifier 321 may determine from the dictionary management information that the user looked up the term 'bucolic' recently. Accordingly, the word identifier 321 may decrease the complexity score for 'bucolic.' If the adjusted complexity score is less than the initial reading level threshold, the word is no longer selected for inclusion in the custom dictionary. Similarly, the user profile may indicate that the user is from the United Kingdom, but located in America. Thus, any idioms from the United Kingdom the user would likely understand, whereas many Americans might have trouble with those idioms. Accordingly, the word identifier 321 may increase the complexity score for idioms from the United Kingdom for that user.

The dictionary generator 330 generates a custom dictionary using the selected words. The dictionary generator 330 retrieves word definition information for the selected candidate words. The dictionary generator 330 may include a dictionary store 324 that includes definition information for some of the candidate words. The dictionary generator 330 may retrieve definition information from the dictionary store 324 for the selected candidate words. Additionally, the dictionary generator 330 may request definition information from one or more definition sources 104. The dictionary generator 330 generates the custom dictionary by pairing the word definition information with the selected candidate words including their associated complexity score. The dictionary generator 330 associates the initial reading level threshold with the custom dictionary such that, for example, the words emphasized by the e-book reader 106 to the user are in accordance with the user's reading level. Additionally, in some embodiments the dictionary generator 330 may link some or all of the candidate words in the dictionary with one or more corresponding locations in the text of the e-book. The linked text-dictionary word is such that selecting a word in the text (e.g., user selects by placing cursor next to the word) may automatically call and display the definition information for that word. In alternate embodiments, the dictionary generator 330 may select all the candidate words and their associated candidate scores for inclusion in the custom dictionary.

The dictionary server 335 provides the custom dictionary (or portions thereof) to the user client 100 operated by the user. Additionally, the dictionary server 335 may provide a requested e-book (or portions thereof) or a location (e.g., e-book database 101) of the requested e-book to the user client 100. The dictionary server 335 may provide the custom dictionary with the e-book or at other times.

Additionally, the custom dictionary provided to the user client 100 may be modified based on adjustments made at the user client 100 to the reading level. If the reading level is adjusted, the dictionary generator 330 can re-generate the custom dictionary using a reading level threshold that is associated with the adjusted reading level. The re-generated custom dictionary may then be provided to the user client 100 via dictionary server 335. In alternate embodiments, if the reading level is adjusted lower, the dictionary generator 330 may retrieve any missing word definition information and provide it to the user client 100 via dictionary server 335.

Moreover, in some embodiments, the custom dictionary provided to the user client 100 may be modified based on later received dictionary management information. In this embodiment, the word identifier 321 monitors the received dictionary management information to determine if any changes should be made to the complexity scores of the words in the custom dictionary. For example, the word identifier 321 may monitor the dictionary management information to determine if changes in the user's reading history, click history, and/or other user events cause any changes in complexity scores for words in the custom dictionary. If a word complexity score is changed, the dictionary server 335 provides the updated complexity score to the user client 100. Additionally, in some embodiments, if the complexity score of a word increases above the reading level threshold, the dictionary generator 330 may retrieve any missing word definition information associated with the word and provide it to the user client 100 via dictionary server 335.

Figure 4:
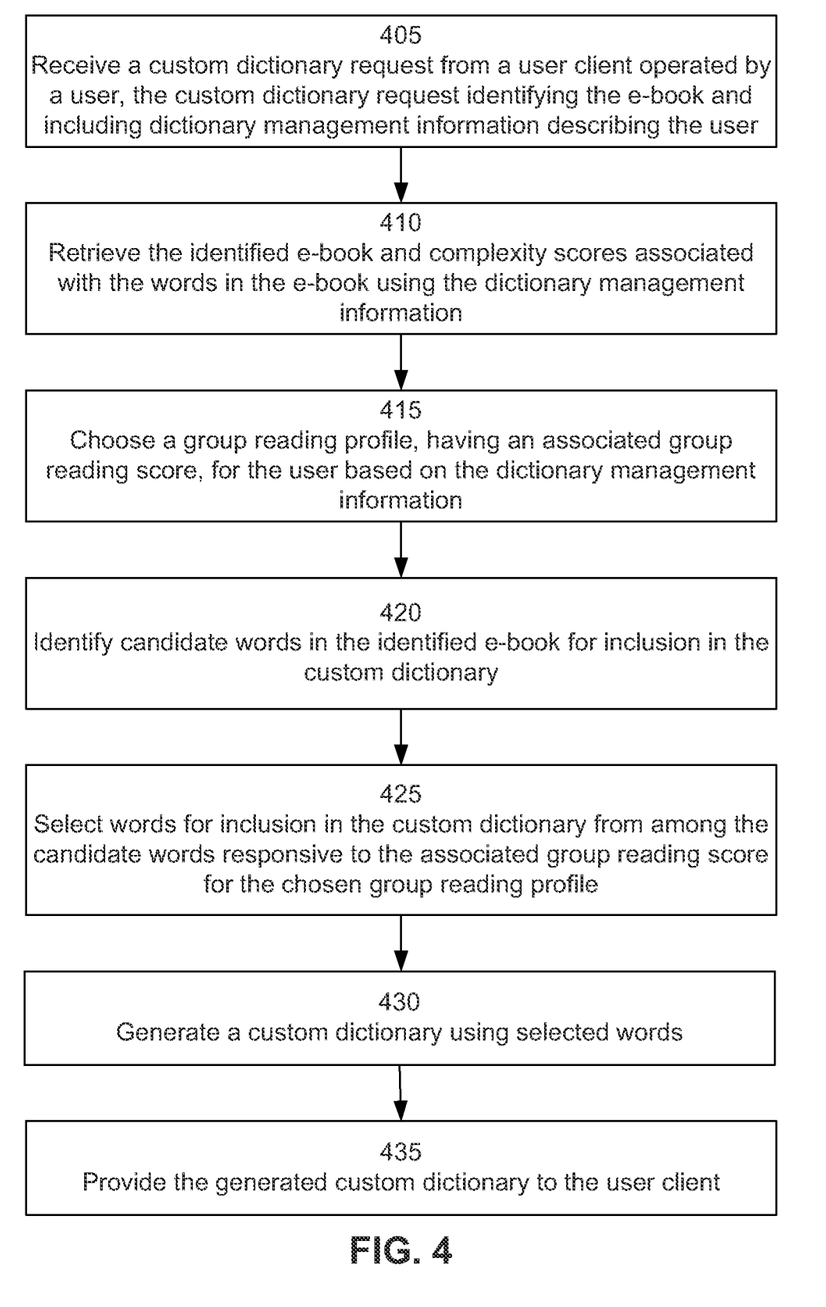
FIG. 4 is a flowchart illustrating the process of generating a custom dictionary in an e-book management system, according to one embodiment.

FIG. 4 is a flowchart illustrating the process of generating a custom dictionary according to one embodiment. In one embodiment, the process of FIG. 4 is performed by the DGS 102. Other entities may perform some or all of the steps of the process in other embodiments. Likewise, embodiments may include different and/or additional steps, or perform the steps in different orders.

In this embodiment the DGS 102 receives 405 a custom dictionary request from a user client 100 operated by a user, the custom dictionary request identifying the e-book and including dictionary management information describing the user. The DGS 102 retrieves 410 the identified e-book and the complexity scores associated with the words in the e-book. The e-book and complexity scores may be located using an e-book identifier that may be included in the dictionary management information. If the e-book has been previously requested, the e-book and associated complexity scores may be retrieved from a local store (e.g., e-book profile store 316). Otherwise, the DGS 102 may retrieve the e-book and complexity scores from an external source (e.g., e-book database 101).

The DGS 102 chooses 415 a group reading profile, having an associated group reading score, for the user based on the dictionary management information. The group reading profile is selected by comparing components of the dictionary management information, such as demographic information, to those of the plurality of group reading profiles.

The DGS 102 identifies 420 candidate words in the identified e-book for inclusion in the custom dictionary. The word identifier 321 identifies a word in the e-book as a candidate word if the word has an associated complexity score. Additionally, in different embodiments, if no complexity scores are retrieved, the DGS 102 may calculate the complexity scores, and associate the calculated complexity scores with the corresponding words.

The DGS 102 selects 425 words for inclusion in the customized dictionary from among the candidate words responsive to the associated group reading score for the chosen group reading profile. The DGS 102 selects words for inclusion in the custom dictionary from among the candidate words if the candidate words are associated with complexity scores higher than a group reading score associated with the selected group reading profile. In alternate embodiments, the DGS 102 selects all the candidate words for inclusion in the custom dictionary. Additionally, in some embodiments, the DGS 102 may adjust complexity scores based on the user profile.

The DGS 102 generates 430 a custom dictionary using the selected words. The DGS 102 generates the custom dictionary by retrieving word definition information for the selected candidate words, and pairing the word definition information with the selected candidate words including their associated complexity scores. Additionally, the DGS 102 may set an initial reading level threshold equal to the group reading score, and associate the initial reading level with the custom dictionary. The DGS 102 provides 435 the custom dictionary (or portions thereof) to the user client 100 operated by the user.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated dictionary generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method of generating a custom dictionary for an e-book, comprising:
    receiving a first custom dictionary request from a user client operated by a user, the first custom dictionary request identifying the e-book and including dictionary management information describing the user;
    choosing a first reading level threshold for the user based on the dictionary management information;
    identifying a first set of candidate words in the identified e-book for inclusion in the first custom dictionary;
    selecting words for inclusion in the first custom dictionary from among the first set of candidate words responsive to the first reading level threshold;
    generating the first custom dictionary using the selected words;

providing the generated first custom dictionary to the user client;
receiving a second custom dictionary request from the user client, the second custom dictionary request identifying the e-book and including a second reading level threshold that is lower than the first reading level threshold;
selecting a second set of candidate words that have higher complexity scores than the first reading level threshold;
retrieving word definition information for the second set of candidate words that were not part of the first custom dictionary; and
providing the retrieved word definition information to the user client.

2. The computer-implemented method of claim 1, wherein the dictionary management information comprises information describing the user's e-book usage.

3. The computer-implemented method of claim 1, wherein choosing the first reading level threshold for the user comprises:
identifying a plurality of group reading profiles each having an associated group reading score;
comparing the dictionary management information describing the user with demographic information associated with the plurality of group reading profiles;
choosing a group reading profile for the user from among the plurality of group reading profiles responsive to the comparison; and
determining the first reading level threshold based on the chosen group reading profile.

4. The computer-implemented method of claim 1, wherein each candidate word has a complexity score that indicates a likelihood that the word is not known by the user, and selecting words from among the first set of candidate words for inclusion in the first custom dictionary comprises selecting candidate words that have complexity scores higher than the first reading level threshold.

5. The computer-implemented method of claim 4, further comprising:
adjusting a complexity score for a candidate word responsive to the dictionary management information associated with the user.

6. The computer-implemented method of claim 1, wherein providing the retrieved word definition information to the user client further comprises:
generating a second custom dictionary using the selected second set of candidate words; and
providing the generated second custom dictionary to the user client.

7. A non-transitory computer-readable storage medium storing executable computer program instructions for generating a custom dictionary for an e-book, the instructions executable to perform steps comprising:
receiving a first custom dictionary request from a user client operated by a user, the first custom dictionary request identifying the e-book and including dictionary management information describing the user;
choosing a first reading level threshold for the user based on the dictionary management information;
identifying a first set of candidate words in the identified e-book for inclusion in the first custom dictionary;
selecting words for inclusion in the first custom dictionary from among the first set of candidate words responsive to the first reading level threshold;
generating the first custom dictionary using the selected words;
providing the generated first custom dictionary to the user client;
receiving a second custom dictionary request from the user client, the second custom dictionary request identifying the e-book and including a second reading level threshold that is lower than the first reading level threshold;
selecting a second set of candidate words that have higher complexity scores than the first reading level threshold;
retrieving word definition information for the second set of candidate words that were not part of the first custom dictionary; and
providing the retrieved word definition information to the user client.

8. The computer-readable medium of claim 7, wherein the dictionary management information comprises information describing the user's e-book usage.

9. The computer-readable medium of claim 7, wherein choosing the first reading level threshold for the user comprises:
identifying a plurality of group reading profiles each having an associated group reading score;
comparing the dictionary management information describing the user with demographic information associated with the plurality of group reading profiles;
choosing a group reading profile for the user from among the plurality of group reading profiles responsive to the comparison; and
determining the first reading level threshold based on the chosen group reading profile.

10. The computer-readable medium of claim 7, wherein each candidate word has a complexity score that indicates a likelihood that the word is not known by the user, and selecting words from among the first set of candidate words for inclusion in the first custom dictionary comprises selecting candidate words that have complexity scores higher than the first reading level threshold.

11. The computer-readable medium of claim 10, further comprising:
adjusting a complexity score for a candidate word responsive to the dictionary management information associated with the user.

12. The computer-readable medium of claim 7, wherein providing the retrieved word definition information to the user client further comprises:
generating a second custom dictionary using the selected second set of candidate words; and
providing the generated second custom dictionary to the user client.

13. A system for generating a custom dictionary for an e-book, comprising:
a processor configured to execute modules; and
a memory storing the modules, the modules comprising:
a user account manager module configured to receive a first custom dictionary request from a user client operated by a user, the first custom dictionary request identifying the e-book and including dictionary management information describing the user,
a group profiler module configured to choose a first reading level threshold for the user based on the dictionary management information,
a word identifier module configured to identify a first set of candidate words in the identified e-book for inclusion in the first custom dictionary,
a dictionary generator module configured to:
select words for inclusion in the first custom dictionary from among the first set of candidate words responsive to the first reading level threshold, and
generate the first custom dictionary using the selected words;

a dictionary server module configured to provide the generated first custom dictionary to the user client, the user account manager module further configured to receive a second custom dictionary request from the user client, the second custom dictionary request identifying the e-book and including a second reading level threshold that is lower than the first reading level threshold, the dictionary generator module further configured to:
    select a second set of candidate words that have higher complexity scores than the second reading level threshold, and
    retrieve word definition information for the second set of candidate words that were not part of the first custom dictionary; and the dictionary server module is further configured to provide the retrieved word definition information to the user client.

14. The system of claim 13, wherein the dictionary management information comprises information describing the user's e-book usage.

15. The system of claim 13, wherein the group profiler module is further configured to:
    identify a plurality of group reading profiles each having an associated group reading score;
    compare the dictionary management information describing the user with demographic information associated with the plurality of group reading profiles;
    choose a group reading profile for the user from among the plurality of group reading profiles responsive to the comparison; and the word identifier module is further configured to determine the first reading level threshold based on the chosen reading group profile.

16. The system of claim 13, wherein each candidate word has a complexity score that indicates a likelihood that the word is not known by the user, and the dictionary generator module is further configured to select words from among the first set of candidate words for inclusion in the first custom dictionary that have complexity scores higher than the first reading level threshold.

17. The system of claim 16, wherein the word identifier module is further configured to adjust a complexity score for a candidate word responsive to the dictionary management information associated with the user.

18. The system of claim 13, wherein:

the dictionary generator module is further configured to:
    generate a second custom dictionary using the selected second set of candidate words; and the dictionary server module is further configured to provide the generated second custom dictionary to the user client.

\* \* \* \* \*